United States Patent Office 3,784,674
Patented Jan. 8, 1974

3,784,674
ATMOSPHERE PURIFICATION OF RADON AND RADON DAUGHTER ELEMENTS
Lawrence Stein, Downers Grove, Ill., assignor to the United States of America as represented by the United States Atomic Energy Commission
No Drawing. Filed Sept. 9, 1971, Ser. No. 179,229
Int. Cl. C01b 23/00
U.S. Cl. 423—249
5 Claims

ABSTRACT OF THE DISCLOSURE

A method of removing radon and radon daughter elements from an atmosphere containing these elements by passing the atmosphere through a bed of fluorinating compound whereby the radon and radon daughters are oxidized to their respective fluorides. These fluorides adhere to the fluorinating compound and are thus removed from the atmosphere which may then be recirculated. A method for recovering radon and separating radon from its daughter elements is also described.

CONTRACTUAL ORIGIN OF THE INVENTION

The invention described herein was made in the course of, or under, a contract with the United States Atomic Energy Commission.

BACKGROUND OF THE INVENTION

This invention relates to a method for purifying an atmosphere of radon and radon daughter elements which may be contained therein. More specifically, this invention relates to a method for removing radon and radon daughter elements from the atmosphere and for recovering the radon.

Radon is a heavy, radioactive, gaseous element formed by the alpha disintegration of radium. The most common isotope, $^{222}$Rn, is an alpha emitter, with a half-life of 3.8 days. Radon is inherently associated with radium in uranium ores and, with its principal radioactive daughters, $^{218}$Po, $^{214}$Pb, $^{214}$Bi, and $^{214}$Po, constitutes a potential health hazard in uranium mining and ore handling operations. The daughter elements are solids and tend to be retained in the lungs, where they may ultimately cause cancer.

Forced ventilation is generally used to lower concentrations of the radioactive elements in the atmosphere of a uranium mine, but it is often difficult to lower the concentrations adequately in all parts of a mine by this method, since the gaseous radon diffuses continuously from exposed veins of uranium ore and from piles of the broken ore.

One method which has been suggested for the removal of radon and its daughter elements from the atmosphere is to pass the atmosphere through a fluorinating solution which will oxidize the radon and daughter elements to fluoride compounds which will then dissolve in the solution. However, the use of liquid fluorinating solutions presents several problems. For example, the liquids are highly corrosive and would require corrosion-resistant equipment to contain them. It would be difficult to pass the large volume of air in a uranium mine through the scrubbers and associated equipment necessary to contact the fluorinating liquid and remove the fluoride compounds formed. In addition, liquid radon oxidizers have high dissociation pressures which means that the atmosphere after it has passed through the liquid will require further and additional equipment treatment to remove any hazardous vapors picked up from the fluorinating solution before the atmosphere can be recirculated.

SUMMARY OF THE INVENTION

This invention relates to a method of purifying an atmosphere of radon and radon daughter elements comprising passing the atmosphere through a reaction bed of a fluorinating compound, said compound being a solid complex fluoride formed by the reaction of a halogen fluoride and a metal fluoride, whereby the radon and radon daughter elements are oxidized to their respective fluoride compounds which remain on the bed and are thereby separated from the atmosphere, and recirculating the purified atmosphere.

The method of this invention is also useful for the quantitative collection of radon and radon daughter elements for analytical purposes, and for the collection and subsequent recovery of radon, which is useful in the radiation treatment of cancer.

It is therefore one object of this invention to provide a method for the purification of an atmosphere of any radon and radon daughter elements which may be contained therein.

It is another object of this invention to provide a method for the purification of an atmosphere of radon and radon daughter elements which may be contained therein utilizing solid materials.

It is a further object of this invention to provide a method for collecting and recovering radon.

Finally, it is the object of this invention to provide a method for purifying the atmospheer of uranium mines by removal of the radon and radon daughter elements associated therewith utilizing solid materials.

DESCRIPTION OF THE PREFERRED EMBODIMENT

These and other objects of the invention may be attained by passing the atmosphere containing the radon and radon daughter elements through a reaction bed of a solid complex fluoride fluorinating compound whereby the radon and radon daughter elements are oxidized to nonvolatile fluoride compounds which remain in the bed and are thus removed from the atmosphere which may then be recirculated.

The solid fluorinating compound may be any fluoride compound with sufficient oxidizing power to fluorinate elemental radon, since the radon daughter elements can be fluorinated more easily than elemental radon. The fluorinating compounds are complex fluorides which are formed by reactions of halogen fluorides and metal fluorides. The compounds which are the best fluorinating agents are compounds formed by reactions of halogen fluorides with strong Lewis acids, i.e. metal fluorides which form strong bonds with a fluoride ion, such as antimony and bismuth pentafluorides. However, weaker Lewis acids and some Lewis bases have also been found to be useful. Following are a number of metal fluorides which react with halogen fluorides to form useful solid complex fluoride fluorinating compounds: $SbF_3$, $SbF_5$, $BiF_3$, $BiF_5$, $VF_3$, $VF_5$, $NbF_5$, $TaF_5$, $KF$, $CsF$, $RbF$, and $NaF$. The halogen fluorides which will react with the beforementioned metal fluorides to form solid compounds are $ClF_3$, $BrF_3$, $BrF_5$, $IF_5$, and $IF_7$.

Among the complex fluoride compounds which may be formed by the reaction of the halogen fluorides and the metal fluorides, the best fluorinating agents, that is the agents with which the best recovery of radon and the radon daughter elements was attained or is expected to be attained, are the compounds containing antimony, bismuth and tantalum, for example, $ClF_2SbF_6$, $BrF_2SbF_6$, $BrF_4Sb_2F_{11}$, $IF_4(SbF_6)_3$, $IF_4SbF_6$, $BrF_2TaF_6$, $BrF_2BiF_6$, and $ClF_2BiF_6$.

The complex fluoride compounds described herein may be easily made by those skilled in the art. For example, a desired amount of $SbF_5$ can be condensed into a metal test tube and an excess amount of $ClF_3$ added thereto. The fluorides are frozen together with liquid nitrogen, allowed to warm up to room temperature and mixed by shaking. Upon completion of the reaction, the test tube is cooled to room temperature and any excess $ClF_3$ is pumped from the test tube, leaving the $ClF_2SbF_6$.

The method of this invention is operable at temperatures from about 0° C. to about 150° C., although temperatures from 0 to about 35° C. are preferred since the higher temperatures will result in increased dissociation of the fluorinating compound and more corrosive fumes which must be removed from the radon purified atmosphere before it may be recirculated.

The compounds are crystalline powders, and the atmosphere to be purified of radon and radon daughters is passed through a reaction bed made up of the radon-fluorinating compound in powder form so that any of the radon and daughter elements in the atmosphere will contact the bed and will be oxidized to their respective fluoride compounds which will remain in the bed and will thus be removed from the atmosphere.

It is believed that the fluorinating compounds work in the following manner. The radon is oxidized by the solid fluorinating agent and probably forms a complex fluoride. For example, in the reaction of radon wtih $BrF_2^+SbF_6^-$, the product is probably $RnF^+SbF_6^-$. Similarly, in the reaction with $BrF_2^+TaF_6^-$, the product is probably $$RnF^+TaF_6^-$$

(The radon is oxidized from the 0 to the +2 valence state in each of these examples and the bromine is reduced.)

The radon can be readily recovered from the fluorinating compound and separated from the radon daughter elements by hydrolyzing the reaction bed containing the radon fluoride. The reaction bed will thus be reduced and dissolve, as will the radom daughter element fluorides, while the radon is released as a gas and may be easily collected. The reaction bed may be hydrolyzed by the passage of excess water vapor through it.

If the atmosphere from which the radon and radon daughter elements are to be removed contains any moisture, it will be necessary to dry the air before it is contacted with the fluorinating compound, since water vapor will decompose radon fluoride and the fluorinating compounds. This drying step may be accomplished by passing the humid atmosphere through a desiccant such as anhydrous calcium sulfate, magnesium perchlorate or silica gel or by passing the air over refrigeration to remove the water by condensation.

It may be necessary to remove vapors of oxidants or solvents from the radon-free atmosphere before it can be recirculated should the fluorinating bed contain reagents having high vapor pressures. These vapors may be removed by passing the air over cooling coils to condense the vapor or through a chemical such as soda lime or activated alumina that will react with and remove the vapors.

An apparatus for removing radon and radon daughters from the air of a uranium mine would consist of the following parts: (1) an air-drying unit; (2) a radon and radon-daughter-fluorinating unit; (3) a vapor-trapping unit; and (4) a pump or blower for forcing the air through the three successive units. The air in a mine is generally very humid, and since water vapor decomposes radon fluoride and the fluorinating reagents, the air must be dried before it is pased through the second unit.

In the second unit, the dry air is brought into contact with the fluorinating compound, which converts the elemental radon and radon daughters to their respective fluorides. The fluorides adhere to the oxidizing compound and are thereby removed from the air stream.

Any vapors of oxidants or solvents escaping from the second unit are trapped in the third unit. The third unit contains either cooling coils that condense the vapors, chemical, such as soda lime or activated alumina, that react with and remove the vapors, or both. Only a small amount of vapor must be removed from the air in the third unit if a fluorinating compound with a low dissociation pressure is used in the second unit.

The pump or blower could be any conventional unit having sufficient capacity to move an adequate amount of air through the preceding units.

An apparatus for the collection of radon and radon daughters from air samples for analysis would consist essentially of the same units as previously described except that they could be on a much smaller scale. If the air to be sampled is not very humid, or if a sufficient amount of reagent is present in the fluorinating unit to react with the water vapor, radon and radon daughters without being depleted, the drying unit can be eliminated. If the vapor pressure of the fluorinating compound in the fluorinating unit is very low, or if the air sample is small, the vapor-trapping unit can also be eliminated. For small air samples the air pump can also be replaced by an evacuated vessel of known volume; atmospheric pressure can then be used to force air through the three units and into the vessel as the latter is slowly opened through a needle valve.

The radon and radon daughters adhere to the fluorinating compound of the second unit after they are converted to fluorides. This compound can be counted for $\gamma$-activity ot determine lead-214 and bismuth-214; after equilibrium is established, the amounts of lead-214 and bismuth-214 indicate the amount of radon present.

The following examples are given as illustrative of the method of this invention and are not to be taken as limiting the scope or extent of the invention.

Example I

A mixture of 5.9 mCi of radon-222 and 0.69 liter of dry air (STP) was passed through a column of $$ClF_2SbF_6$$

powder approximately two inches long in a Kel-F plastic U-tube having an I.D. of ¼ inch. The powder was at room temperature (23–25° C.). After leaving the U-tube, the gas flowed through a second tube, which was cooled with liquid nitrogen. Any radon that passed through the U-tube without reacting was condensed in the second tube. At the conclusion of the experiment, the distribution of radon was determined by measuring the gamma-emission of daughters lead-214 and bismuth-214 from each tube; the short-lived daughters were known to be in radioactive equilibrium with the radon. Approximately 97% of the radon was found in the powder, as nonvolatile radon fluoride, and approximately 3% was found in the cold trap.

Example II

In a similar experiment, a mixture of 15 mCi of radon-222 and 0.69 liter of dry air was passed through a tube having an I.D. of ¼ inch and containing a column of $ClF_2SbF_6$ approximately four inches long and into a tube cooled by liquid nitrogen. All of the radon was collected by the compound in this instance, as determined in the manner of Example I. All of he daughter elements were also collected.

In the table below are the results of a number of other experiments which were performed using the method of Example I.

| Compound | Amount of radon and air | Percentage of radon collected by powder |
|---|---|---|
| $BrF_2SbF_6$ | 8.0 mCi in 0.69 liter | 100 |
| $BrF_4Sb_2F_{11}$ | 3.7 mCi in 0.69 liter | 100 |
| $IF_4(SbF_6)_3$ | 7.4 mCi in 0.69 liter | 100 |
| $IF_4SbF_6$ | 3.6 mCi in 0.69 liter | 76 |
| $BrF_2TaF_6$ | 3.0 mCi in 0.69 liter | 27 |
| $KBrF_4$ | 2.8 mCi in 0.76 liter | 28 |
| $CsBrF_6$ | 2.2 mCi in 0.76 liter | 7 |
| $RbClF_4$ | 3.4 mCi in 0.69 liter | 16 |
| $KClF_4$ | 4.9 mCi in 0.69 liter | 19 |

Example III

In an experiment conducted in a manner similar to the previous examples, a mixture of 15 mCi radon-222 in 0.69 liter of dry air is pased through a four-inch-long bed of $BrF_2BiF_6$ contained in a Kel-F tube having an I.D. of ¼ inch before passing into a tube cooled by liquid nitrogen. It is expected that at least 50% of the radon will be fluorinated and remain on the bed of $BrF_2BiF_6$.

As can be seen from the above examples, the method of this invention will readily remove radon and radon daughter elements from an atmosphere containing them in a safe and effective manner.

The gas flow rates used in the test experiments were very low (3–12 ml./min.) due to the small dimensions of the apparatus. Much higher flow rates would be used in large-scale equipment for purifying the air in a uranium mine. In an enclosed section of a mine, a suitable flow rate would be determined by the volume of the enclosure, the exposed surface area, the rate of diffusion of radon from ore to air per unit surface area and the rate of introduction of fresh air. The concentration of radon in the air would be determined by the equilibrium between the rate of influx and the rate of removal of radon.

It is to be understood that the invention is not to be limited by the details given herein but that it may be modified within the scope of the appended claims.

The embodiments of the invention in which an exclusive property or privilege is claimed are defined as follows:

1. A method of purifying an atmosphere of radon and radon daughter elements comprising drying the atmosphere of any moisture passing the dried atmosphere through a reaction bed of a fluorinating compound, said compound being a solid complex fluoride formed by the reaction of a halogen fluoride selected from the group consisting of $ClF_3$, $BrF_3$, $BrF_5$, $IF_5$, and $IF_7$ and a metal fluoride selected from the group consisting of $SbF_3$, and $SbF_5$, whereby the radon and radon daughter elements are oxidized to their respective fluoride compounds which remain on the bed and are thereby separated from the atmosphere, and recirculating the purified atmosphere.

2. The method of claim 1 wherein the fluorinating compound is selected from the group consisting of $ClF_2SbF_6$, $BrF_2SbF_6$, $BrF_4Sb_2F_{11}$, $IF_4(SbF_6)_3$, $IF_4SbF_6$.

3. The method of claim 2 comprising the further step of treating the atmosphere after removal of the radon and radon daughter elements to remove vapors of the fluorinating compound from the atmosphere before recirculating the purified atmosphere.

4. A method of recovering radon from an atmosphere containing radon and radon daughter elements comprising drying the atmosphere of any moisture, passing the dried atmosphere through a reaction bed of a fluorinating compound having sufficient oxidizing power to fluorinate elemental radon, said compound being a solid complex fluoride formed by the reaction of a halogen fluoride selected from the group consisting of $ClF_3$, $BrF_3$, $BrF_5$, $IF_5$ and $IF_7$, and a metal fluoride sleected from the group consisting of $SbF_3$, $SbF_5$, $BiF_3$, $BiF_5$, $VF_3$, $VF_5$, $NbF_5$, $TaF_5$, $CsF$, $RBF$, and $NaF$ whereby the radon and radon daughter elements are oxidized to their respective fluoride compounds which remain on the bed and are thereby separated from the atmosphere, hydrolyzing the reaction bed, thereby dissolving the fluorinating compound and the fluoride compounds of the radon daughter elements and releasing the radon as a gas, and collecting the radon.

5. The method of claim 4 wherein the flourinating compound is selected from the group consisting of $ClF_2SbF_6$, $BrF_2SbF_6$, $BrF_4Sb_2F_{11}$, $IF_4(SbF_6)_3$, $IF_4SbF_6$, $BrF_2TaF_6$, $BrF_2BiF_6$, $BrF_4BiF_6$, and $ClF_2BiF_6$.

References Cited

Stein, Oxidized Radon in Halogen Fluoride Solutions, J. Am. Chem. Soc. 91, 5396 (1969).

Sheft et al., High Temperature Fluorination Reaction of Inorg. Substances with $BF_3$ Addition Compounds, J. Am. Chem. Soc. 78, 1557 (1956).

Pomeroy, J. H., Noble Gas Compounds. Chicago, 1963, p. 123–125.

EARL C. THOMAS, Primary Examiner

S. B. SHEAR, Assistant Examiner

U.S. Cl. X.R.

423—210, 262